United States Patent
Inuzuka

(10) Patent No.: US 7,202,766 B2
(45) Date of Patent: Apr. 10, 2007

(54) MAGNETIC ELEMENT

(75) Inventor: Tsutomu Inuzuka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/529,643

(22) PCT Filed: Jun. 24, 2004

(86) PCT No.: PCT/JP2004/009293

§ 371 (c)(1),
(2), (4) Date: Mar. 31, 2005

(87) PCT Pub. No.: WO2005/006359

PCT Pub. Date: Jan. 20, 2005

(65) Prior Publication Data

US 2006/0066432 A1 Mar. 30, 2006

(30) Foreign Application Priority Data

Jul. 10, 2003 (JP) ............... 2003-195044

(51) Int. Cl.
*H01F 27/02* (2006.01)
(52) U.S. Cl. ..................... 336/83; 252/62.62
(58) Field of Classification Search .................. 336/83
See application file for complete search history.

(56) References Cited

U.S. PATENT DOCUMENTS

| | | | | |
|---|---|---|---|---|
| 3,509,058 A | * | 4/1970 | Estival et al. ............ | 252/62.62 |
| 4,696,100 A | * | 9/1987 | Yamamoto et al. ........... | 29/605 |
| 6,076,253 A | * | 6/2000 | Takayama et al. ............ | 29/605 |
| 6,222,506 B1 | * | 4/2001 | So .............................. | 343/895 |
| 6,718,625 B2 | * | 4/2004 | Ito et al. ....................... | 29/606 |
| 2002/0180572 A1 | | 12/2002 | Kakehashi et al. | |

FOREIGN PATENT DOCUMENTS

| JP | 47-7821 B | 3/1972 |
|---|---|---|
| JP | 5-36517 | 2/1993 |
| JP | 11-26223 | 1/1999 |
| JP | 11-205017 | 7/1999 |
| JP | 2000-348845 | 12/2000 |
| JP | 2000-348943 | 12/2000 |
| JP | 2003-31434 | 1/2003 |
| JP | 2003-086425 | 3/2003 |
| JP | 2003-86425 | 3/2003 |
| JP | 2003-106966 | 4/2003 |
| JP | 2003-108966 | 4/2003 |

\* cited by examiner

*Primary Examiner*—Elvin Enad
*Assistant Examiner*—Joselito S. Baisa
(74) *Attorney, Agent, or Firm*—McDermott Will & Emery LLP

(57) ABSTRACT

A magnetic element superior in high frequency characteristics is provided that comprises magnetic ferrite having iron oxide, cobalt oxide and zinc oxide as the main ingredients, a conducting coil formed over the magnetic ferrite, an insulating material covering the conducting coil, and two or more external electrodes connected with the conducting coil.

8 Claims, 3 Drawing Sheets

MAGNETIC ELEMENT

TECHNICAL FIELD

The present invention relates to magnetic elements for use in a variety of electronic equipment.

BACKGROUND ART

Magnetic ferrite, such as spinel type ferrite that has iron oxide, zinc oxide, nickel oxide and magnesium oxide as the main ingredients, has been used as magnetic core material for magnetic elements for use in electronic circuits. These magnetic core materials are used in magnetic elements to be used in low frequency electronic circuits up to circuits operating at 200 MHz by adjusting the compounding ratio of the main ingredients based on Mn—Zn ferrite, Ni—Zn ferrite or Mg ferrite and the amount of additives. The magnetic elements used in these electronic circuits realize various characteristics by utilizing complex magnetic permeability $\mu=\mu'-\mu''\times I$ ($\mu'$: magnetic permeability; $\mu''$: loss component) of the magnetic ferrite used as the magnetic core.

Furthermore, as illustrated in Japanese Patent Laid-Open Application JP H05-36517, magnetic elements that use hexagonal ferrite having iron oxide, barium oxide and strontium oxide as the main ingredients are recently used in electronic circuits operating in frequency bands beyond 200 MHz.

However, with the conventional magnetic ferrite, as the loss component $\mu''$ drastically increases at frequencies below 1 GHz, the limit of use of magnetic elements that use conventional magnetic ferrite as the magnetic core is 1 GHz. On the other hand, advances in the technology toward higher frequencies in association with a trend of digitization of electronic equipment that use these magnetic elements are remarkable. As a result, it is important to realize components that can cope with higher frequencies in order to process high-speed and large-capacity signals.

SUMMARY OF THE INVENTION

The magnetic elements of the present invention include a sintered body of magnetic ferrite prepared by firing mixed powder having iron oxide, cobalt oxide and zinc oxide as the main ingredients, a conducting coil formed on the fired body, an insulating material that covers at least the conducting coil, and two or more external electrodes connected to the conducting coil. These magnetic elements can be used in frequency range beyond 1 GHz.

DETAILED DESCRIPTION

Referring to drawings, a description of the magnetic elements of the present invention will be given in the following embodiments.

Embodiment 1:

A description of embodiment 1 of the present invention will be given referring to FIG. 1 and FIG. 2.

Figure 1:
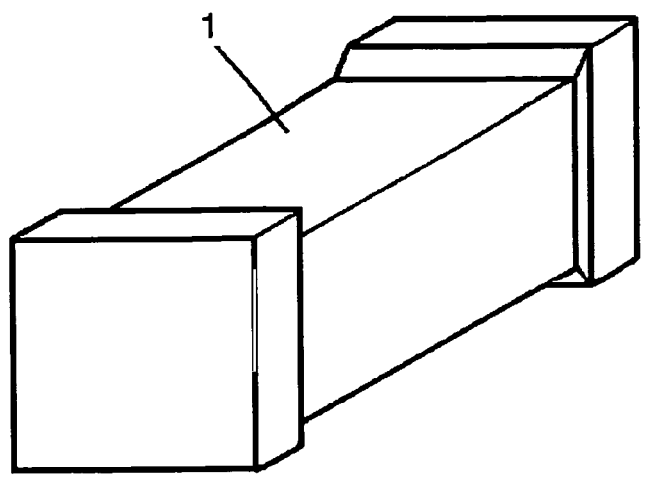
FIG. 1 is a perspective view of an insulator used in a magnetic element in embodiment 1 of the present invention.

FIG. 1 is an illustration of the construction of an insulator to be used in an inductance element as a magnetic element in embodiment 1 of the present invention. FIG. 2 is an illustration of the structure of an inductance element that uses the insulator. Table 1 shows the composition of examples used in embodiment 1 and composition of magnetic ferrite as control examples.

The inductance elements as described in embodiment 1 of the present invention have insulator 1 composed of magnetic ferrite having composition shown in Table 1, and conducting coil 2 formed on the surface of insulator 1 and made of copper or silver. The inductance elements further have insulating layer 3 made of resin and the like on the surface of conducting coil 2 and external electrodes 4 connected to both ends of conducting coil 2.

A practical description of the method of manufacturing the inductance elements will be given in the following together with a description in detail of the structure and electrical characteristics of the inductance elements thus manufactured.

Commercial iron oxide powder, zinc oxide powder and cobalt oxide powder as starting materials of magnetic ferrite are compounded at the ratio as shown in Table 1, a proper amount of pure water is added to the compound, the compound is mixed in a ball mill, and mixed powder is obtained by subsequently drying at 120° C. Calcined powder of ferrite is obtained by calcining the mixed powder at 900° C. and then pulverizing it in a planetary ball mill to a particle size of 8 µm or smaller. Granulating powder having an average particle size of the order of 200 µm is fabricated by adding a proper amount of a PVA (polyvinyl alcohol) solution to the calcined powder of ferrite, and kneading.

Insulator 1 is obtained by subsequently filling the granulating powder in a mold, molding under a predetermined molding condition, and firing in a temperature range 1200 to 1300° C., for example, in which the sintered body will become dense.

Figure 2:
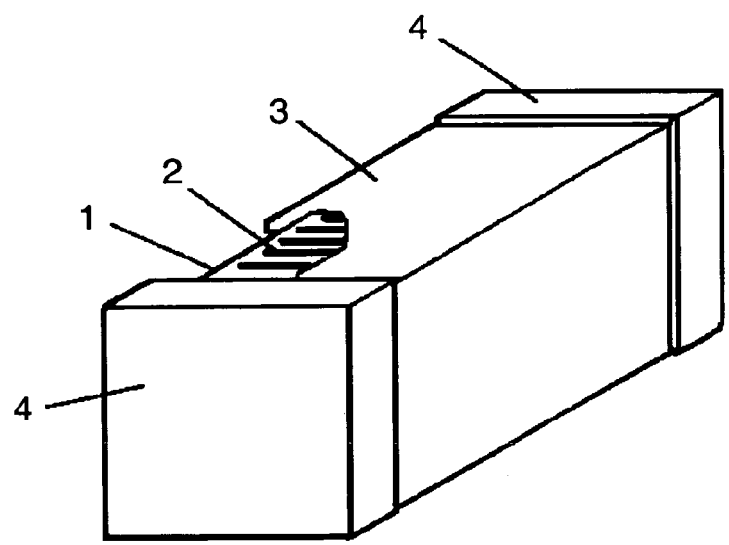
FIG. 2 is a partially cutaway perspective view of an inductance element in embodiment 1 of the present invention.

Conducting coil 2 is then formed by winding a wire around insulator 1, insulating layer 3 is subsequently formed by using an insulating resin or an insulating inorganic material, and inductance elements as shown in FIG. 2 are obtained (exemplary embodiments 1 to 11).

For comparison, an inductance element (control example 1) that uses alumina as the material for insulator 1 and an inductance element (control example 2) that uses hexagonal ferrite for the material of insulator 1 are fabricated. Table 1 shows the characteristics of these inductance elements.

TABLE 1

| | | $Fe_2O_3$ (Mol %) | CoO (Mol %) | ZnO (Mol %) | Inductance (nH) at 2 GHz | Frequency (GHz) at max Q |
|---|---|---|---|---|---|---|
| EE. 1 | CoZn | 48 | 45.5 | 6.5 | 4.0 | 2.5 |
| EE. 2 | Ferrite | 50 | 47 | 3 | 3.1 | 2.6 |
| EE. 3 | | 50 | 42 | 8 | 4.5 | 2.3 |
| EE. 4 | | 45 | 52 | 3 | 3.4 | 2.6 |
| EE. 5 | | 44 | 42 | 14 | 3.4 | 2.6 |
| EE. 6 | | 42 | 52 | 6 | 3.4 | 2.6 |
| EE. 7 | | 42 | 44 | 14 | 3.4 | 2.6 |
| EE. 8 | | 48 | 41 | 11 | 3.2 | 2.7 |
| EE. 9 | | 42 | 55 | 3 | 3.0 | 2.8 |
| EE. 10 | | 42 | 42 | 16 | 3.2 | 2.7 |
| EE. 11 | | 41 | 49 | 10 | 3.2 | 2.7 |
| Control Ex. 1 | Alumina | — | — | — | 2.0 | 3.2 |
| Control Ex. 2 | Hexagonal Ferrite | — | — | — | 4.0 | 0.8 |

Comparing the results of exemplary embodiments 1 through 11 with the result of control example 1 in Table 1, it is observed that the inductance is larger as the magnetic permeability μ' of the magnetic ferrite used is larger, indicating a great improvement in characteristics as inductance elements for use in high frequency circuits.

It is also observed that the frequency at which Q value of the inductance element of control example 2 shows a maximum value at around 0.8 GHz indicating that the loss at frequencies beyond 1 GHz increases so much that the inductance element cannot be used in the GHz band. On the other hand, the frequency at which the Q value reaches at a maximum of any of exemplary embodiments 1 to 11 is in the range 2 to 3 GHz suggesting that any of these exemplary embodiments can be used in the GHz band.

Here, the compounding ratio of iron oxide is preferably 50 mol % or smaller as the Q value tends to decrease when the compounding ratio is larger than 50 mol % when converted to $Fe_2O_3$. Also, the compounding ratio of zinc oxide is preferably at least 3 mol % as the inductance tends to decrease when the compounding ratio is smaller than 3 mol %.

It is also confirmed that similar advantages are obtainable when the oxides to be used as the ingredients or subcomponents to be used as additives of the composition are oxides or carbonates having different valence such as any of $CoO$, $Co_2O_3$, $Co_3O_4$, $CoCO_3$.

Also, in fabricating insulator 1, similar advantage is obtainable by laminating green sheets and cutting or punching them to a desired size, in addition to the method of compression molding using granulating powder.

Also, in forming conducting coil 2, similar advantage is obtainable by forming a spiral coil by forming a film over the entire surface by plating or other thin-film formation technology and spirally cutting it by laser cutting or with a grind stone.

Also, a magnetic material may be blended in insulating layer 3 thereby to further increase the value of inductance. The magnetic material to be blended in insulating layer 3 is preferably powder of magnetic ferrite in accordance with the present invention. Furthermore, it is most preferable that the particle size of the magnetic ferrite powder be 45 μm or larger as the Q value increases as the particle size increases.

Using insulator 1 that uses magnetic ferrite primarily composed of ferric iron, cobalt oxide and zinc oxide as the magnetic core and constructing an inductance element as illustrated in FIG. 1 in this way, an inductance element is realized that can be used in a high frequency range beyond 1 GHz. In addition, a desired value of inductance, an increase in the value of inductance, or miniaturization of an inductance element can be realized. The higher the magnetic permeability μ' of the magnetic ferrite is, the higher the inductance value can be designed, thus enabling downsizing.

Also, the smaller the loss component μ" of the magnetic ferrite used is, the larger the Q value can be increased. And the larger the Q value is in the frequency band to be served, the more superior high frequency inductance element can be provided, Embodiment 2.

Figure 3:
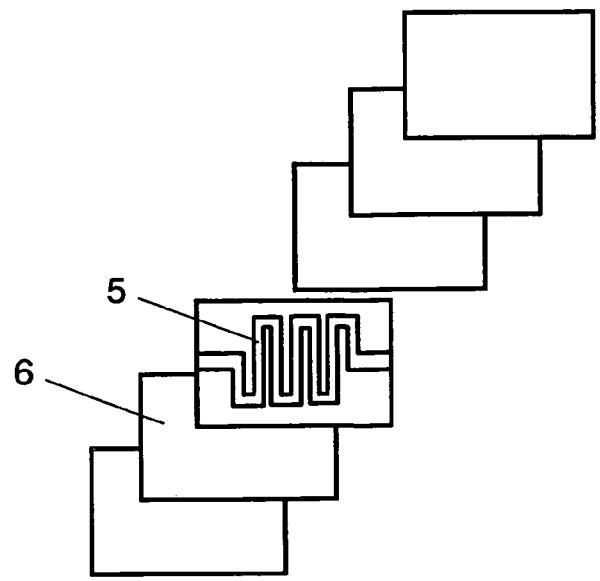
FIG. 3 is an illustration of the structure of an impedance element as a magnetic element in embodiment 2 of the present invention.
Figure 4:
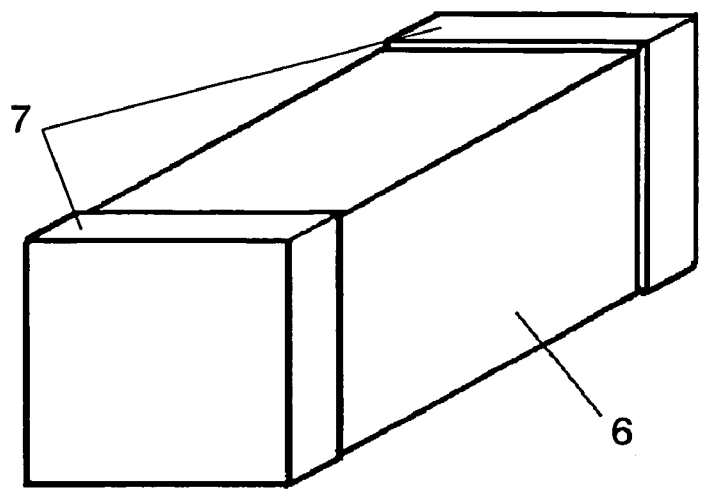
FIG. 4 is a perspective view of an impedance element as a magnetic element in embodiment 2 of the present invention.

Referring to FIG. 3 and FIG. 4, a description of embodiment 2 of the present invention will be given.

FIG. 3 and FIG. 4 are illustrations of the structure of an impedance element as a magnetic element in embodiment 2 of the present invention.

The impedance element in embodiment 2 of the present invention has conductor 5 such as platinum or palladium and magnetic ferrite 6 formed by laminating a green sheet of magnetic ferrite in a manner vertically sandwiching conductor 5. Furthermore, two external electrodes 7 connected to both ends of conductor 5 that is formed in the inside are provided. Here, magnetic ferrite 6 is an insulator.

An impedance element to be used as a noise-reduction component is realized by covering conductor 5, being a signal line, with magnetic ferrite 6. By setting the frequency at which the loss component μ" of magnetic ferrite 6 drastically increases as a cut-off frequency, the impedance value of the impedance element selectively increases at frequencies beyond the cut-off frequency, and noises having frequency components higher than the cut-off frequency are eliminated. The higher the magnetic permeability μ' of magnetic ferrite 6 is, the higher the impedance value can be designed, thus providing a superior impedance element.

A description on practical aspects of the method of fabrication of exemplary embodiments 12 to 22 will be given in the following together with a detailed description of the structure of the impedance elements thus fabricated and their electrical characteristics.

Iron oxide, zinc oxide, and cobalt oxide are compounded at the ratios shown in Table 2, a proper amount of pure water is added to the compound, the compound is mixed in a ball mill, and then dried at 120° C. to obtain mixed powder. Calcined powder of ferrite is obtained by calcining the mixed powder at 900° C. and then pulverizing it to a maximum particle size of 8 μm in a planetary ball mill. Ferrite slurry is obtained by adding to this calcined ferrite powder proper amounts of butyral resin and butyl acetate and fully dispersing them in a ball mill.

Subsequently, ferrite green sheets are obtained from the ferrite slurry thus obtained by means of a doctor blade. Using platinum paste, a pattern of conductor 5 is printed on a ferrite green sheet. The ferrite green sheet on which the pattern of conductor 5 has been printed and two or more ferrite green sheets on which no pattern of conductor 5 is printed are laminated to a desirable thickness, followed by cutting to individual pieces to obtain molded chip products. Sintered bodies of magnetic ferrite 6 on an inner layer of which conductor 5 has been formed are obtained by firing the molded chip products at 1200 to 1300° C. By forming on both ends of magnetic ferrite 6 two external terminals 7 that are connected to both ends of conductor 5, an impedance element as illustrated in FIG. 4 is completed.

Control example 3 is an impedance element fabricated by using hexagonal ferrite. Table 2 shows electrical characteristics of the impedance elements thus obtained.

The results shown in Table 2 indicate that exemplary embodiments 12 to 22 are superior as impedance elements because the cut-off frequency, namely, the frequency at which impedance becomes 10Ω, is higher than that of control example 3, suggesting that they can be used as noise filters in GHz band and that the impedance value is larger as the magnetic permeability μ' of the magnetic ferrite used is larger.

By the way, as the impedance value tends to decrease as the compounding ratio of iron oxide increases beyond 50 mol % when converted to $Fe_2O_3$, the compounding ratio is preferably 50 mol % or smaller. Also, as the impedance value tends to decrease as the compounding ratio of zinc oxide becomes smaller than 3 mol %, the compounding ratio of 3 mol % or larger is preferable.

Also, the platinum pattern as conducting coil 5 to be internally formed need not necessarily be a meander shape, and a spiral coil may be formed by laminating a ferrite green sheet through a via hole. In that case, as the impedance value decreases when the spacing between an end portion of spiral conducting coil 5 and external electrodes 7 is short, it is preferable to make the spacing wide. It is most preferable that the spacing be 200 μm or larger.

Also, while the material for forming conducting coil 5 may be palladium or an alloy of platinum and palladium, platinum or palladium is preferable from the standpoint of obtaining a higher conductivity.

Figure 5:
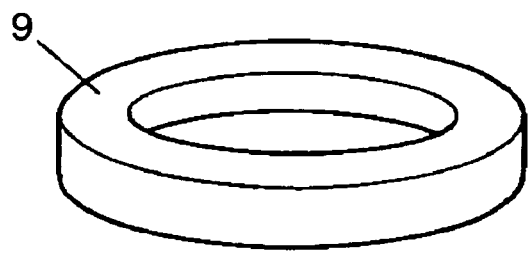
FIG. 5 is a perspective view of a ring-shaped core as a magnetic element in embodiment 3 of the present invention.
Figure 6:
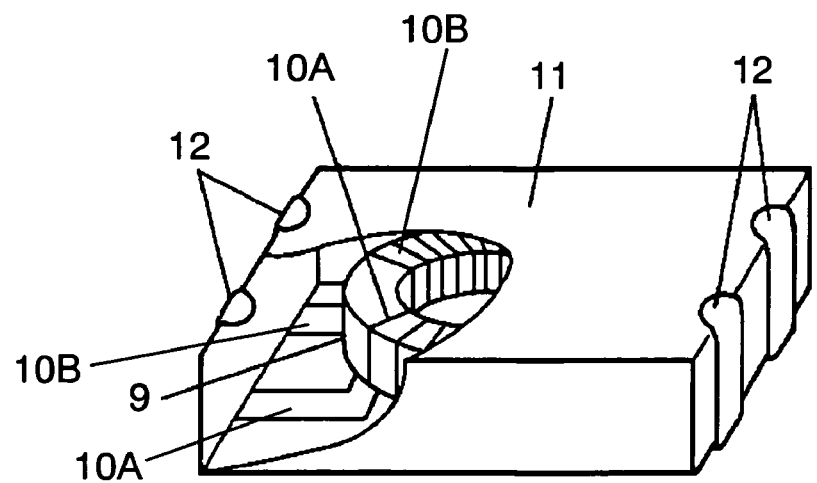
FIG. 6 is a partially cutaway view of a common-mode noise filter as a magnetic element in embodiment 3 of the present invention.

Embodiment 3:

Referring to FIG. 5 and FIG. 6, a description of embodiment 3 of the present invention will be given.

FIG. 5 and FIG. 6 are illustrations of a common-mode noise filter as an embodiment of a magnetic element of the present invention.

As illustrated in FIG. 5 and FIG. 6, the common-mode noise filter of embodiment 3 has ring-shaped core 9 made of magnetic ferrite and two conducting coils 10A, 10B formed on the surface of ring-shaped core 9 and made of copper or silver. On the surface of conducting coils 10A, 10B are provided insulating material layer 11 made of resin and the like and four external terminals 12 connected to the terminals of the two conducting coils 10A, 10B.

Common-mode noise filters used in a differential signaling line of electronic circuits in general are of a structure in which two conducting coils 10A, 10B are wound in the same direction around ring-shaped core 9 made of magnetic ferrite. By adopting this structure, magnetic coupling of the two differential signaling lines can be enhanced by utilizing magnetic permeability μ' of the magnetic ferrite used and common-mode component can be eliminated. The smaller the loss component μ" of the magnetic ferrite used is, the smaller the loss of the signal level to be transmitted becomes, thus a superior common-mode noise filter can be obtained. By using the magnetic ferrite of the present invention as ring-shaped core 9 in such a structure, a common-mode noise filter that can be used in GHz band can be realized.

A description of the method of fabrication of the common-mode noise filter will be given in the following together with a detailed description of the structure of the common-mode noise filter in embodiment 3.

TABLE 2

| | | $Fe_2O_3$ (Mol %) | CoO (Mol %) | ZnO (Mol %) | Cut-off Frequency (GHz) | Impedance Value (Ω) |
|---|---|---|---|---|---|---|
| EE. 12 | CoZn | 48 | 45.5 | 6.5 | 1.3 | 90 |
| EE. 13 | Ferrite | 50 | 47 | 3 | 1.3 | 81 |
| EE. 14 | | 50 | 42 | 8 | 1.2 | 95 |
| EE. 15 | | 45 | 52 | 3 | 1.3 | 85 |
| EE. 16 | | 44 | 42 | 14 | 1.3 | 85 |
| EE. 17 | | 42 | 52 | 6 | 1.3 | 85 |
| EE. 18 | | 42 | 44 | 14 | 1.3 | 85 |
| EE. 19 | | 48 | 41 | 11 | 1.4 | 82 |
| EE. 20 | | 42 | 55 | 3 | 1.4 | 81 |
| EE. 21 | | 42 | 42 | 16 | 1.4 | 82 |
| EE. 22 | | 41 | 49 | 10 | 1.4 | 82 |
| Control Ex. 3 | Hexagonal Ferrite | — | — | — | 0.5 | 30 |

To begin with, granulating powder of calcined ferrite powder having a compounding ratio as shown in Table 3 and an average particle size of 200 μm is prepared through the same process as in embodiment 1. Ring-shaped core 9 is obtained by forming the granulating powder into a shape of a ring and firing it at 1200 to 1300° C. Common-mode noise filters as shown in FIG. 6 are fabricated (exemplary embodiments 23 to 33) by forming on ring-shaped core 9 two conducting coils 10A, 10B by making double windings in the same direction, subsequently forming insulating layer 11 by resin molding, and finally forming external electrodes 12 connected to the terminals of two conducting coils 10A, 10B.

Control example 4 uses, as the material for ring-shaped core 9, hexagonal ferrite with a compounding ratio as shown in Table 3.

TABLE 3

|   |   | $Fe_2O_3$ (Mol %) | CoO (Mol %) | ZnO (Mol %) | Coupling Coefficient |
|---|---|---|---|---|---|
| EE. 23 | CoZn | 48 | 45.5 | 6.5 | 0.8 |
| EE. 24 | Ferrite | 50 | 47 | 3 | 0.78 |
| EE. 25 |  | 50 | 42 | 8 | 0.84 |
| EE. 26 |  | 45 | 52 | 3 | 0.78 |
| EE. 27 |  | 44 | 42 | 14 | 0.78 |
| EE. 28 |  | 42 | 52 | 6 | 0.78 |
| EE. 29 |  | 42 | 44 | 14 | 0.78 |
| EE. 30 |  | 48 | 41 | 11 | 0.78 |
| EE. 31 |  | 42 | 55 | 3 | 0.76 |
| EE. 32 |  | 42 | 42 | 16 | 0.77 |
| EE. 33 |  | 41 | 49 | 10 | 0.77 |
| Control Ex. 4 | Hexagonal Ferrite | — | — | — | 0.50 |

Table 3 shows characteristics of the common-mode noise filters thus obtained.

From the results of Table 3, it is known that the common-mode noise filters of exemplary embodiments 23 to 33 have larger coupling coefficients as the magnetic permeability μ' at 1 GHz is larger than that of control example 4, thus making loss component μ" smaller.

By the way, as the coupling coefficient tends to decrease when the compounding ratio of iron oxide is larger than 50 mol % when converted to $Fe_2O_3$, the compounding ratio is preferably 50 mol % or smaller. Also, as the coupling coefficient tends to decrease when the compounding ratio of zinc oxide is smaller than 3 mol %, the compounding ratio is preferably 3 mol % or larger.

Also, while ring-shaped core 9 provided with windings is molded with insulating layer 11 for the ease of surface mounting in this embodiment, similar advantage is obtained when two conducting coils 10A, 10B are directly connected without resin mold.

Embodiment 4:

A description of embodiment 4 will be given referring to FIG. 7 and FIG. 8.

Figure 7:
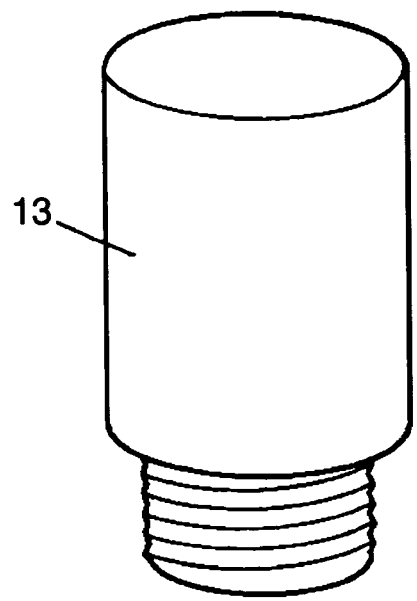
FIG. 7 is an external view of a ferrite core as a magnetic element in embodiment 4 of the present invention.
Figure 8:
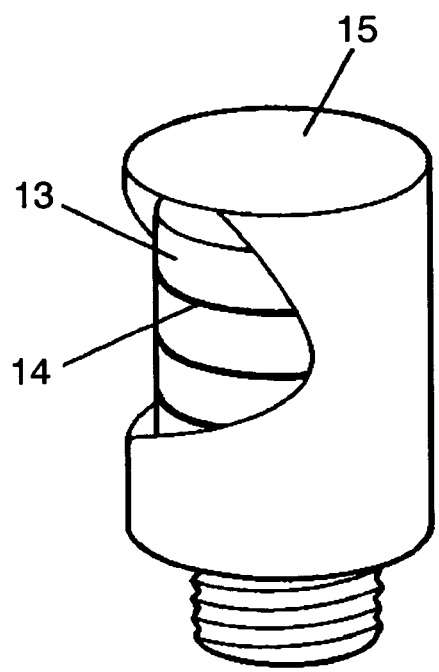
FIG. 8 is a partially cutaway view of an antenna element as a magnetic element in embodiment 4 of the present invention.

FIG. 7 and FIG. 8 are illustrations of an antenna element as a magnetic element of the present invention.

The antenna element of embodiment 4 has ferrite core 13 made of magnetic ferrite and conducting coil 14 formed on the surface of ferrite core 13 and made of copper or silver. Furthermore, conducting coil 14 has insulating material layer 15 made of resin on its surface.

A detailed description of the antenna element of embodiment 4 will be given in the following together with a description of the manufacturing method.

To begin with, granulating powder of calcined ferrite having a compounding ratio as shown in Table 4 is obtained by the same process as embodiment 1. After molding the granulating powder into the shape of a rod, it is fired at 1200 to 1300° C. and is then cut to the shape as illustrated in FIG. 7 to obtain ferrite core 13 for an antenna element. Subsequently, a film of a low resistance metal such as copper or silver is formed by plating, for example, over the entire surface of ferrite core 13 followed by spirally cutting the formed metal film to make conducting coil 14.

Subsequently, antenna elements of exemplary embodiments 34 to 44 are fabricated by covering ferrite core 13 over which conducting coil 14 has been formed with insulating material layer 15 by resin molding, as shown in FIG. 8.

Control example 5 is an antenna element that uses a resin core of similar configuration, and control example 6 is an antenna element that uses hexagonal ferrite for ferrite core 13.

Table 4 shows radiation losses of the antenna elements obtained and the size effects of the antenna elements as a percentage relative to the size of an antenna element that uses resin as the core.

From the results of exemplary embodiments 34 to 44 shown in Table 4, it is known that the larger the value of magnetic permeability μ' of the magnetic ferrite used is, the smaller is the size of the antenna element than the one that uses resin as the core.

TABLE 4

|   |   | $Fe_2O_3$ (Mol %) | CoO (Mol %) | ZnO (Mol %) | Size (%) | Radiation Loss (dB) |
|---|---|---|---|---|---|---|
| EE. 34 | CoZn | 48 | 45.5 | 6.5 | 85 | −1.7 |
| EE. 35 | Ferrite | 50 | 47 | 3 | 83 | −1.9 |
| EE. 36 |  | 50 | 42 | 8 | 80 | −1.9 |
| EE. 37 |  | 45 | 52 | 3 | 83 | −1.7 |
| EE. 38 |  | 44 | 42 | 14 | 83 | −1.9 |
| EE. 39 |  | 42 | 52 | 6 | 83 | −1.7 |
| EE. 40 |  | 42 | 44 | 14 | 83 | −1.9 |
| EE. 41 |  | 48 | 41 | 11 | 83 | −1.9 |
| EE. 42 |  | 42 | 55 | 3 | 82 | −1.9 |
| EE. 43 |  | 42 | 42 | 16 | 83 | −1.7 |
| EE. 44 |  | 41 | 49 | 10 | 83 | −1.9 |
| Control Ex. 5 | Resin | — | — | — | 100 | −0.5 |
| Control Ex. 6 | Hexagonal Ferrite | — | — | — | Unmeasurable | −8.8 |

Also, as control example 6 shows, the radiation loss of an antenna element that uses hexagonal ferrite as ferrite core 13 is large and the size of the antenna element cannot be precisely determined.

It is also known that, while radiation loss of the antenna element that uses hexagonal ferrite for ferrite core 13 is as large as −8.8 dB, that of any of exemplary embodiments 34 to 44 is −2.0 dB or smaller, indicating that the radiation loss is small enough for practical use in the 2 GHz band.

By the way, as for the compounding ratio of iron oxide, 50 mol % or smaller when converted to $Fe_2O_3$ is preferable because the radiation loss increases when it is larger than 50 mol %. As for the compounding ratio of zinc oxide, 3 mol % or larger is preferable because the advantage of size reduction decreases when it is smaller than 3 mol %.

It is also confirmed that similar advantages are obtainable when the oxides to be used as the ingredients or subcomponents to be used as additives of the composition are oxides or carbonates having different valence such as any of $CoO$, $Co_2O_3$, $Co_3O_4$, $CoCO_3$.

Connection with a circuit can be made by soldering or caulking, and it is preferable to provide screw threads on the connecting section to secure strength of connection.

As the method of providing threads, powder press method using a split die may be used in addition to machining.

Also, for metal plating, Ag, Cu, Au, Al, Ni, Pt, Pd can be used, and Ag and Cu that have large conductivity are more preferable among them.

As for the method of forming conducting coil 14, similar advantage is also obtainable by winding a wire or making a coil by punching a metal plate.

Also, a thin film of a nonmagnetic material may be formed between the surface of ferrite core 13 and conducting coil 14.

Also, the antenna elements may be covered by resin molding or capped with a molded resin case.

Also, needless to say, as the present invention utilizes an effect of wavelength reduction due to magnetic permeability μ', similar advantages can be obtained with antenna elements like patch antennas in addition to the above-described helical antennas.

INDUSTRIAL APPLICABILITY

As has been described above, the present invention relates to magnetic elements that employ magnetic ferrite having iron oxide, cobalt oxide and zinc oxide as the main ingredients, and provides magnetic elements that can be used in electronic circuits operable in GHz band.

The invention claimed is:

1. A magnetic element comprising:
a rod-shaped sintered insulator of magnetic ferrite;
a conducting coil formed around the sintered insulator;
two external electrodes connected to the conducting coil, wherein the insulator is made by firing mixed powder, main ingredients of the mixed powder including:
41 to 50 mol % of iron oxide when converted to $Fe_2O_3$;
3 to 16 mol % of zinc oxide when converted to ZnO; and
41 to 55 mol % of cobalt oxide when converted to CoO.

2. An impedance element comprising:
a sintered insulator of magnetic ferrite;
a conducting coil provided in a meander shape or a spiral shape inside the magnetic insulator; and
two external electrodes connected to the conducting coil, wherein the insulator is made by firing mixed powder, main ingredients of the mixed powder including:
41 to 50 mol % of iron oxide when converted to $Fe_2O_3$;
3 to 16 mol % of zinc oxide when converted to ZnO; and
41 to 55 mol % of cobalt oxide when converted to CoO.

3. A common-mode noise filter comprising:
a ring-shaped core made of sintered magnetic ferrite;
two conducting coils wound in the same direction around the core; and
four external electrodes connected to the coils,
wherein the core is made by firing mixed powder, main ingredients of the mixed powder including:
41 to 50 mol % of iron oxide when converted to $Fe_2O_3$;
3 to 16 mol % of zinc oxide when converted to ZnO; and
41 to 55 mol % of cobalt oxide when converted to CoO.

4. An antenna element comprising:
a cylindrical core made of sintered magnetic ferrite;
a conducting coil spirally wound around the cylindrical core; and
a threaded connecting section on one end of the core,
wherein the core is made by firing mixed powder, main ingredients of the mixed powder including:
41 to 50 mol % of iron oxide when converted to $Fe_2O_3$;
3 to 16 mol % of zinc oxide when converted to ZnO; and
41 to 55 mol % of cobalt oxide when converted to CoO.

5. A magnetic element of claim 1, wherein a Q value reaches a maximum at a frequency of no less than 2 GHz.

6. An impedance element of claim 2, wherein a cut-off frequency is no less than 1.2 GHz.

7. A common-mode noise filter of claim 3, wherein a coupling coefficient is no less than 0.76.

8. An antenna element of claim 4, wherein radiation loss is no more than −2.0 dB.

* * * * *